US005991289A

United States Patent [19]
Huang et al.

[11] Patent Number: 5,991,289
[45] Date of Patent: Nov. 23, 1999

[54] SYNCHRONIZATION METHOD AND APPARATUS FOR GUARD INTERVAL-BASED OFDM SIGNALS

[75] Inventors: Chia-Chi Huang, Hsinchu; Yung-Liang Huang, Hsinchu Hsien; Chorng-Ren Sheu, Kaohsiung, all of Taiwan

[73] Assignee: Industrial Technology Research Institute, Taiwan

[21] Appl. No.: 08/906,424

[22] Filed: Aug. 5, 1997

[51] Int. Cl.$^6$ .................................................. H04B 7/08
[52] U.S. Cl. ........................ 370/350; 370/504; 375/326; 375/260
[58] Field of Search .................................. 370/203, 206, 370/208, 210, 434, 503, 504, 350, 510, 226, 328, 329, 330, 322, 326; 375/355, 343, 260

[56] References Cited

U.S. PATENT DOCUMENTS

| | | | |
|---|---|---|---|
| 5,533,066 | 7/1996 | Yamaguchi et al. | 375/341 |
| 5,596,582 | 1/1997 | Sato et al. | 370/203 |
| 5,602,835 | 2/1997 | Seki et al. | 370/206 |
| 5,732,113 | 3/1998 | Schmidl et al. | 375/355 |
| 5,774,450 | 6/1998 | Harada et al. | 370/206 |
| 5,790,784 | 8/1998 | Beale et al. | 370/350 |
| 5,818,813 | 10/1998 | Saito et al. | 370/208 |

*Primary Examiner*—Alpus H. Hsu
*Assistant Examiner*—Daniel Prev'l
*Attorney, Agent, or Firm*—Finnegan, Henderson, Farabow, Garrett & Dunner, L.L.P.

[57] ABSTRACT

A synchronization system for an input signal having a plurality of OFDM symbols, each symbol having at least one guard interval, includes a correlation device for providing a product of the input signal with a complex conjugate of the input signal delayed for a predetermined period, an arithmetic device for obtaining an argument value of the product, and a detection device for detecting a transition in phase values of an output of the arithmetic device, wherein the transition occurring when the phase value in one portion of the symbol duration is substantially smaller than another portion of the symbol duration. The system additionally includes a power estimator for detecting an OFDM symbol frame of the input signal with reference to a predetermined threshold, and a device for estimating fractional carrier frequency offset.

18 Claims, 5 Drawing Sheets

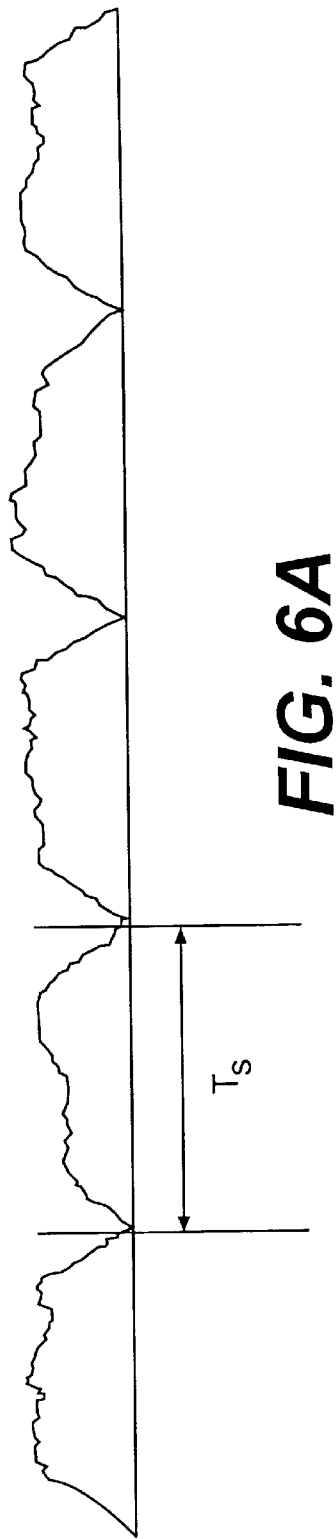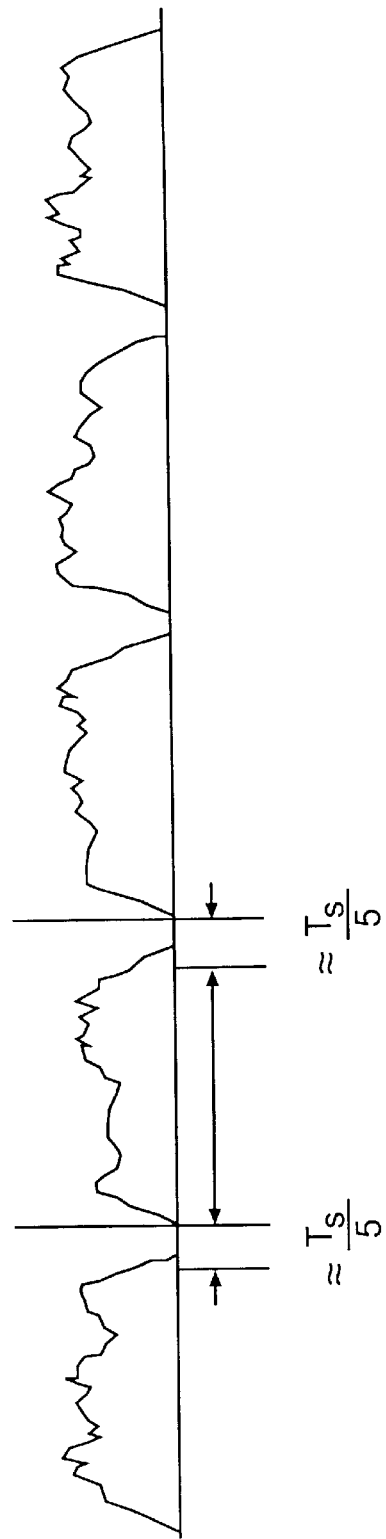

SYNCHRONIZATION METHOD AND APPARATUS FOR GUARD INTERVAL-BASED OFDM SIGNALS

BACKGROUND OF THE INVENTION

1. Field of the Invention

This invention pertains in general to a synchronization method and apparatus for digital receivers and, more particularly, to a method and apparatus for obtaining symbol, frame, and carrier synchronization for guard interval-based OFDM signals.

2. Description of the Related Art

Digital audio broadcasting ("DAB") and digital video broadcasting ("DVB") systems provide high quality signals with minimal impact due to multipath fading, noise, or signal drop-offs relative to those of analog broadcasting. The reduction of impact from multipath fading is largely due to the fact that many DAB and DVB systems have adopted orthogonal frequency division multiplexing ("OFDM") modulation. Multipath fading, together with intersymbol interference, may be additionally reduced in OFDM signals by the insertion of guard intervals. For the most part, an OFDM signal is preceded by a cyclic extension of the last portion of a symbol, and this extension is placed as the guard interval.

FIG. 1 shows an OFDM signal having a guard interval, wherein the duration of the guard interval is represented by $T_g$ and the duration of the useful OFDM symbols is represented by $T_u$. Also, the duration of the guard interval is equal to, for example, approximately one-fourth of the duration of the useful OFDM symbols. The definition of a "useful symbol" is described below. Additionally, the OFDM signal shown in FIG. 1 is the same as that of the European-based Eureka 147 DAB system because the guard interval of that system is also equal to approximately one-fourth of the duration of the OFDM symbols.

FIG. 2 illustrates a transmission frame of the Eureka 147 system. As shown in FIG. 2, the Eureka 147 transmission frame is divided into a synchronization channel, a fast information channel, and a main service channel. The channels that constitute the transmission frame consist of a sequence of consecutive OFDM symbols and each symbol consists of a set of equally-spaced carriers. In addition, as already described, each of the channels is preceded by a periodic extension of the symbol itself that constitutes the guard interval. The duration of the guard interval is approximately ¼ of the useful symbols' duration, and the symbols in the guard interval are reproduced from the final ¼ of the useful symbols of the channel.

The synchronization channel always occupies the first two symbols of the transmission frame. The first symbol of the synchronization channel is a null symbol, which is also the first symbol of the transmission frame. The null symbol carries no information, and the DAB signal is primarily noise for the duration of the null symbol. The second symbol of the synchronization channel, which is also the second symbol of the transmission frame, is a phase reference ("PR") symbol that acts as a pilot symbol for the next symbol. The synchronization channel therefore serves as the reference for the time information carried in the fast information channel, and is repeated at the transmission frame rate.

The PR symbol acts not only as a reference for differential quadrature phase shift key modulation and demodulation for the next OFDM symbol, but also as a pilot symbol for synchronization. As with many communication systems, however, synchronization for a DAB or DVB system at various communication layers, especially frame, carrier, and clock synchronization at the physical layer, is important. Because of various changes in propagation channels for DAB and DVB systems, symbol and carrier synchronization are difficult. Although algorithms and systems for conventional OFDM systems have been devised, they usually require different frame structures or do not provide for frame, carrier, and clock synchronization.

SUMMARY OF THE INVENTION

Accordingly, the present invention is directed to a synchronization method and apparatus that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the methods and apparatus particularly pointed out in the written description and claims hereof, as well as the appended drawings.

To achieve these and other advantages, and in accordance with the purpose of the invention as embodied and broadly described, there is provided an apparatus for determining symbol timing information from an input signal having a symbol duration and including of at least one OFDM symbol having at least one guard interval. The apparatus includes correlation means for providing a product of the input signal with a complex conjugate of a delayed input signal, means for calculating argument values of the product for providing a conditioned signal having a transition in phase values by rendering phase values of a portion of the symbol duration substantially less than phase values of the remaining portion of the symbol duration, and detection means, coupled to receive the conditioned signal from the means for calculating argument values, for detecting the transition in phase values as symbol timing information.

In another aspect, the apparatus includes arithmetic means, coupled between the means for calculating argument values and the detection means, for obtaining absolute values of the conditioned signal.

In yet another aspect, the apparatus includes arithmetic means, coupled between the means for calculating argument values and the detection means, for performing moving sum calculations on the conditioned signal thereby providing an indication in phase values transition at a same location as the transition in phase values.

In still another aspect, the apparatus includes differentiator means, coupled between the means for calculating argument values and the detection means, for controlling phase distributions within the OFDM symbol.

Also, in accordance with the invention, there is provided a synchronization system for an input signal having at least one OFDM symbol including of at least one guard interval. The system includes correlation means for providing a product of the input signal with a complex conjugate of a delayed input signal, arithmetic means, coupled to receive an output of the correlation means, for obtaining argument values of the product, and detection means, coupled to the arithmetic means, for detecting a transition in phase values of an output of the arithmetic means, where the transition occurs when a phase value in one portion of the symbol duration is substantially smaller than a phase value of the remaining portion of the symbol duration.

In another aspect, the system includes power estimation means, coupled between the correlation means and the arithmetic means, for detecting an OFDM symbol frame of the input signal with reference to a predetermined threshold value.

In yet another aspect, the system includes means for estimating fractional carrier frequency offset, coupled to the arithmetic circuit and the detection means.

Also, in accordance with the present invention, there is provided a method for estimating fractional carrier frequency offset of an input signal having a plurality of OFDM symbols, each symbol including of at least one guard interval. The method includes the steps of delaying the input signal by a predetermined duration, multiplying the input signal with a complex conjugate of the delayed input signal, determining argument values of the multiplied signal to produce an output signal that has at least one high-to-low transition such that phase values of a first portion of the symbol decrease substantially compared to a second portion of the symbol and at least one low-to-high transition such that phase values of a third portion of the symbol increase substantially compared to a fourth portion of the symbol, identifying the high-to-low phase transition in one of the plurality of OFDM symbols, and commencing estimation of the fractional carrier frequency offset at the high-to-low phase transition.

In another aspect, the method includes the steps of identifying the low-to-high phase transition in one of the plurality of OFDM symbols contiguous to the OFDM symbol from which the high-to-low phase transition is identified, and terminating the estimation of the fractional carrier frequency offset at the second phase transition.

In yet another aspect, the method includes the step of applying moving sum calculations after the argument values have been determined.

The present invention additionally provides a method for obtaining symbol timing synchronization of an input signal having a plurality of OFDM symbols, each symbol having at least one guard interval, comprising the steps of delaying the input signal by a predetermined amount of duration, multiplying the input signal with a complex conjugate of the delayed input signal, determining argument values of the multiplied signal to produce an output signal that has at least one high-to-low transition such that phase values of a first portion of the symbol decrease substantially compared to a second portion of the symbol and at least one low-to-high transition such that phase values of a third portion of the symbol increase substantially compared to a fourth portion of the symbol, identifying the high-to-low phase transition in one of the plurality of OFDM symbols, and identifying the low-to-high phase transition in one of the plurality of OFDM symbols contiguous to the OFDM symbol from which the high-to-low phase transition is identified.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings:

FIG. 6A shows symbol phase values of an OFDM signal having been subjected to moving sum calculations, wherein the window of the moving average is equal to the guard interval $T_g$; and FIG. 6B shows symbol phase values of an OFDM signal having been subjected to moving sum calculations, wherein the window of the moving average is less than the guard interval $T_g$.

DETAILED DESCRIPTION OF THE PREFERRED EMBODIMENTS

The present invention provides a method and system for symbol, frame, and carrier synchronization for guard interval-based OFDM signals by utilizing the characteristics of guard intervals to first obtain symbol timing synchronization. Specifically, the phase value during most of the duration of an OFDM symbol is a random value. However, during a certain portion of the OFDM symbol, the phase value is a constant, and this duration is usually equal to the duration of the guard interval. Thus, the present invention provides an apparatus and method for obtaining symbol timing synchronization based on the phase value characteristics of a guard interval-based OFDM signal. After having obtained symbol timing synchronization, frame synchronization is obtained and fractional carrier frequency offset is estimated. Through automatic frequency control ("AFC") compensation, the integral carrier frequency offset may similarly be estimated thereby obtaining symbol, frame, and carrier synchronization.

Figure 3:
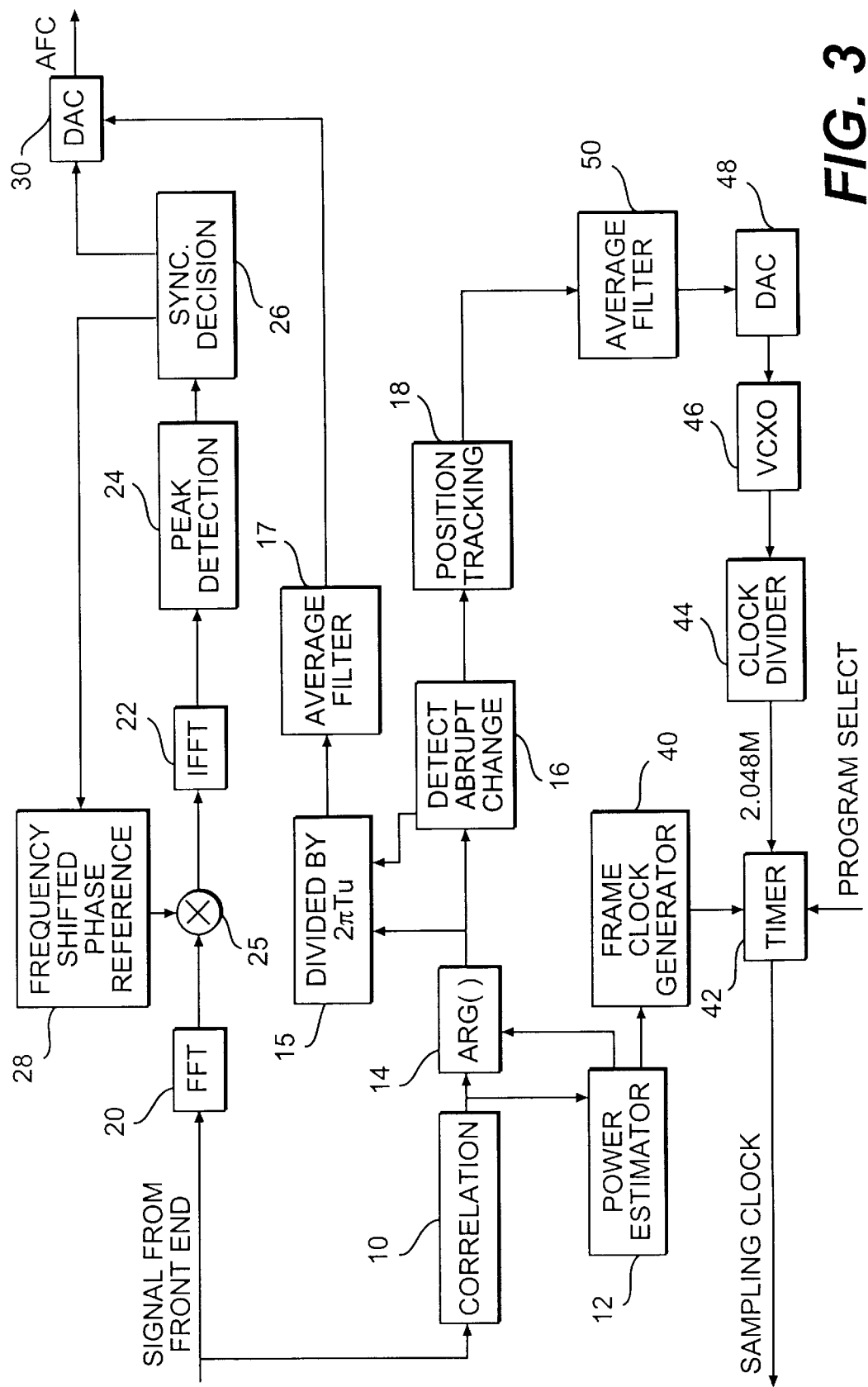
FIG. 3 shows a block diagram of a synchronization system constructed in accordance with the present invention.

FIG. 3 shows a block diagram of an embodiment of the present invention for obtaining symbol, frame, and carrier synchronization. Referring to FIG. 3, the block diagram comprises a circuit for obtaining symbol timing synchronization including a correlation circuit 10, an arithmetic circuit 14 for obtaining argument values, a detection circuit 16, and a position tracking circuit 18. The block diagram also comprises a circuit for estimating fractional carrier frequency offset including an arithmetic circuit 15 for performing a division operation and an average filter 17, together with correlation circuit 10 and arithmetic circuit 14.

Figure 4:
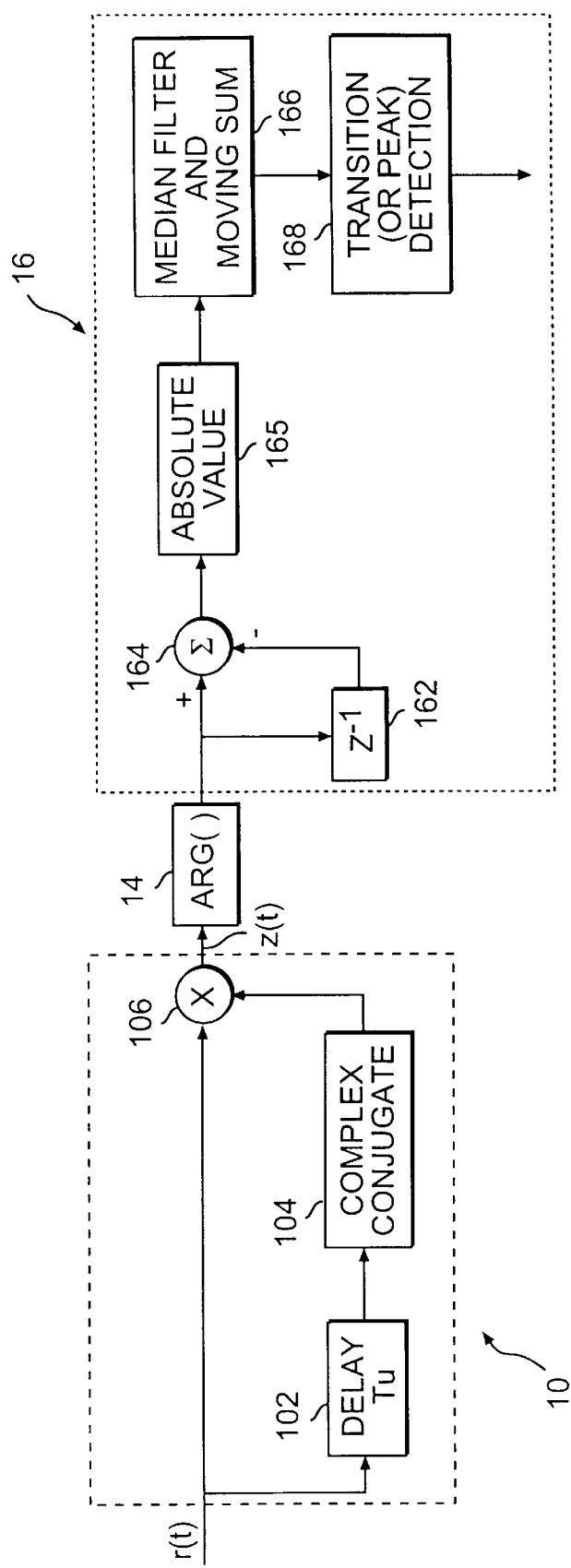
FIG. 4 shows a block diagram of one embodiment of the detection circuit of the present invention.

Regarding the circuit for obtaining symbol timing synchronization, correlation circuit 10 establishes the relationship between an OFDM symbol and a guard interval within the symbol. An embodiment of the correlation circuit 10 is shown in FIG. 4, and includes a delay circuit 102, an arithmetic circuit 104, and a multiplier 106. The relationship between a symbol and a guard interval is obtained by applying a predetermined delay to an input signal r(t). In the case of the Eureka 147 system, the predetermined delay should be set to equal the duration of the useful symbols, $T_u$. Referring to FIG. 4, delay circuit 102 applies the predetermined delay, $T_u$, to the input signal r(t). Coupled to delay circuit 102 is arithmetic circuit 104 to provide a complex conjugate of the delayed input signal $r^*(t-T_u)$. Multiplier 106, coupled to arithmetic circuit 104, multiplies the input signal with the complex conjugate of the input signal from arithmetic circuit 104. An output signal z(t) from multiplier 106 is expressed as follows:

$$z(t) = r(t)r^*(t - T_u)$$
$$= a(t)e^{j2\Pi(\Delta f_I + \Delta f_R)t}a^*(t)e^{-j2\Pi(\Delta f_I + \Delta f_R)(t-T_u)}$$
$$= |a(t)|^2 e^{j2\Pi\Delta f_I t + j2\Pi\Delta f_R t - j2\Pi\Delta f_I t + j2\Pi\Delta f_I T_u - j2\Pi\Delta f_R t + j2\Pi\Delta f_R T_u}$$
$$= ce^{j2\Pi\Delta f_R T_u} e^{j2\Pi\Delta f_I T_u}$$

where a(t) and a*(t) are the amplitudes of the signals r(t) and $r^*(t-T_u)$, respectively, and c is equal to $|a(t)|^2$. In addition, $\Delta f_R$ is the fractional carrier frequency offset and $\Delta f_I$ is the integral carrier frequency offset. Since $\Delta f_I T_u$ is an integer:

$$z(t) = ce^{j2\Pi\Delta f_R T_u} \quad (1)$$
$$\Delta f_R = \frac{arg[z]}{2\Pi T_u}$$

The output of multiplier 106 of FIG. 4 is the same as an output of correlation circuit 10 shown in FIG. 3.

Argument values of output signal z(t) are determined by arithmetic circuit 14, coupled to correlation circuit 10 as shown in FIG. 3 or multiplier 106 as shown in FIG. 4. During the final portion of a symbol period $T_s$, the duration of which is equal to the duration of the guard interval $T_g$, the argument value of z(t) is a constant and is in proportion to the value of $\Delta f_R$. As already described, the guard interval $T_g$ is reproduced from approximately the final ¼ of the useful symbol. However, for the remaining portion of the signal duration, r(t) and $r^*(t-T_u)$ are not correlated, and thus the phase during this period is one of random value.

Figure 1:
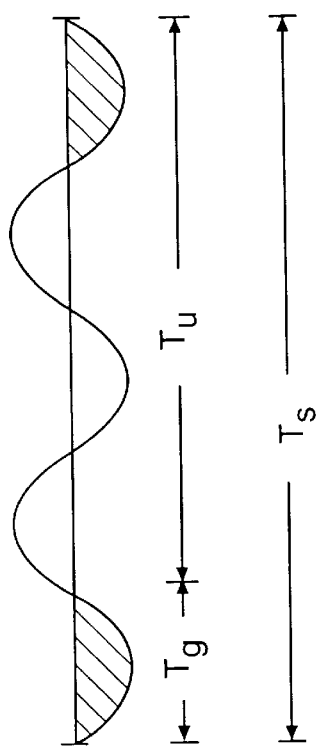
FIG. 1 shows an OFDM signal having a guard interval inserted.
Figure 2:
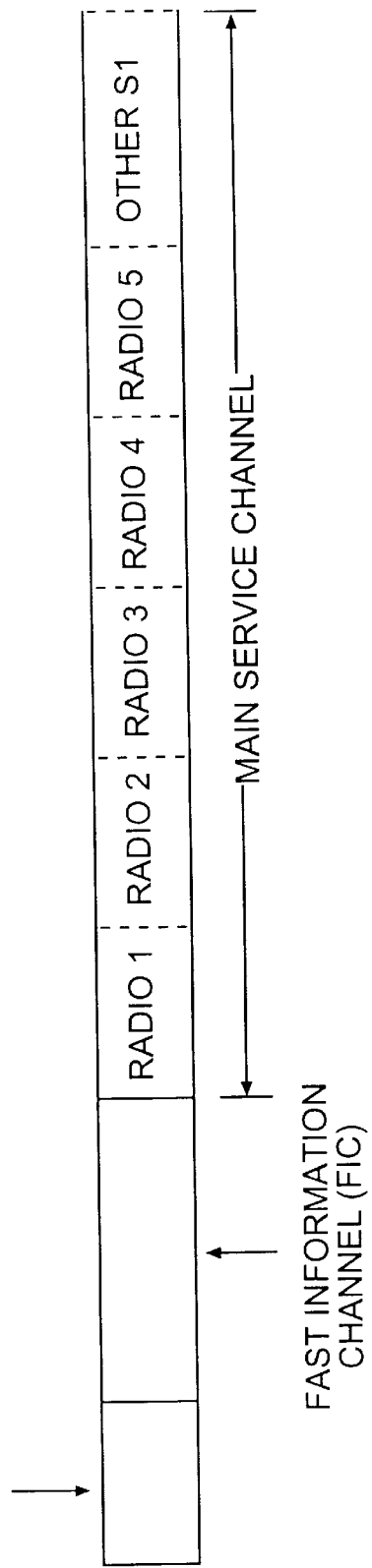
FIG. 2 shows the transmission frame structure of the Eureka 147 DAB system.
Figure 5A:
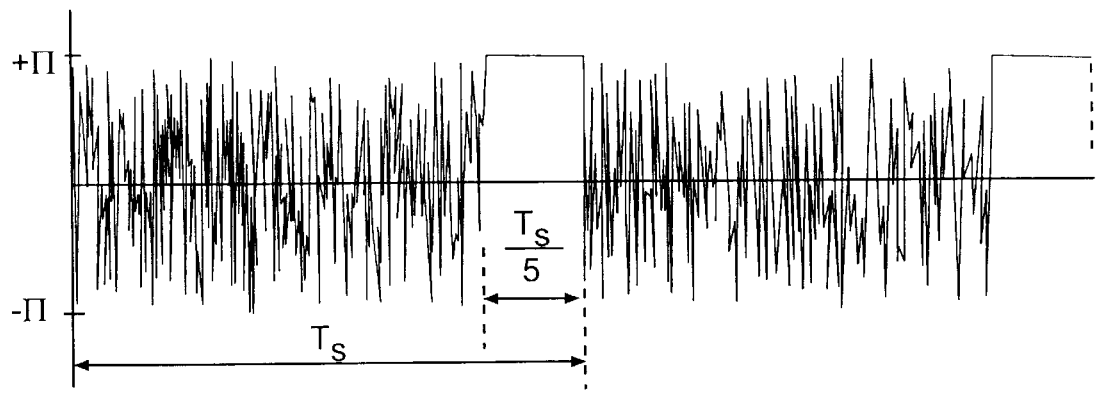
FIG. 5A shows the phase values of the Eureka 147 system signal having been subjected to a correlation circuit constructed in accordance with the present invention.

These characteristics are consistent with the Eureka 147 signals. Referring to FIG. 1, the guard interval $T_g$ is a reproduction of approximately one-fourth of the useful symbol duration, $T_u$, and is approximately one-fifth of the overall symbol duration $T_s$. FIG. 5A shows the phase of output signal z(t) of the Eureka 147 signal during the symbol period, $T_s$. For the first ⅘ portion of each OFDM symbol, phase values are uniformly distributed random values having amplitudes of between −II and +II. For the last ⅕ portion of the signal, however, the phase is a constant. Referring to equation (1), the constant is equal to $2\Pi\Delta f_R T_u$. At the end of the symbol duration or at the beginning of the next symbol, the phase value is again random until the final ⅕ portion of the symbol, at which time the phase value is again a constant. This pattern is repeated for each symbol of the OFDM signal. Additionally, FIG. 5A shows clear transitions from a random phase to a constant phase and vice versa. The transitions in phase distributions not only provide symbol timing information but also are used in accordance with the present invention as indications to start and stop fractional carrier frequency offset estimation.

With regard to the symbol timing synchronization, one aspect of the present invention relates to a detection circuit that detects the transitions to estimate symbol timing. Although the phase distribution transitions shown in the output signal of arithmetic circuit 14 may be detected with a detection circuit, a preferred embodiment of the present invention provides for additional implementations to further distinguish the transitions. Referring again to FIG. 3, after obtaining argument values of output z(t) over at least one symbol period, arithmetic circuit 14 provides an input to detection circuit 16. An embodiment of detection circuit 16 is shown in FIG. 4, which includes a one-sample delay filter 162, a subtractor 164, an arithmetic circuit 165 for absolute value calculations, a filter and moving sum circuit 166, and a transition detection circuit 168.

Delay filter 162, coupled to arithmetic circuit 14, provides a one-sample smoothing of the input provided by arithmetic circuit 14. Subtractor 164 subtracts the output of delay filter 162 from the output of arithmetic circuit 14. In a preferred embodiment, delay filter 162 and subtractor 164 comprise a differentiator circuit to render the constant phase value portion of the input provided by arithmetic circuit 14 to approximately zero. The abrupt changes in the phase values provided by the differentiator circuit, from one having a random value between +II and −II to a value of close to zero, and vice versa, also may be detected with a transition detection circuit.

Figure 5B:
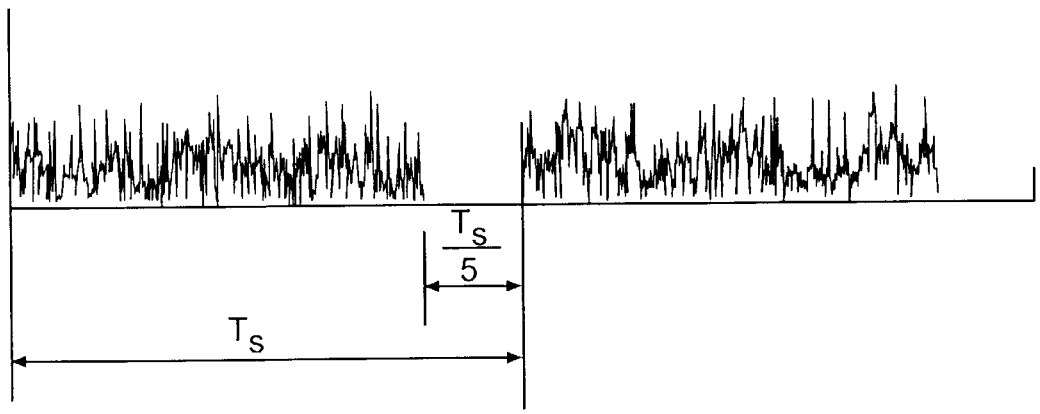
FIG. 5B shows the differentiated signal of FIG. 5A having been subjected to absolute value calculations.

To additionally facilitate the detection of the transitions, absolute values are obtained of the phase values to change the phase distribution. The resultant signal is shown in FIG. 5B. Interference, primarily noise spikes, presents in the resultant signal shown in FIG. 5B may be removed with a filter. The filtered resultant signal may also be subjected to moving sum calculations to additionally facilitate the detection of the phase transitions by creating distinct transitional indicators. The result of a signal having been subjected to moving sum calculations is shown in FIGS. 6A and 6B. FIG. 6A shows symbol phase values of an OFDM signal having been subjected to moving sum calculations, wherein the window of the moving average is equal to the guard interval $T_g$. FIG. 6B also shows the OFDM signal after having been subjected to the moving sum calculations. However, the window of the moving average is less than the guard interval $T_g$ whereby a distinct high-to-low transition is created at a location approximately equal to ⅘ of the symbol length $T_s$ and a low-to-high transition at approximately the end of the symbol or the beginning of the next symbol.

Referring to FIG. 4, arithmetic circuit 165, coupled to subtractor 164, obtains the absolute values of the input provided by subtractor 164. Arithmetic circuit 165 may be implemented with a full wave rectifier. Coupled to arithmetic circuit 165 is medium filter and moving sum circuit 166. The filter portion of circuit 166 removes interference caused by energy noise. Meanwhile, the moving sum portion of circuit 166 performs moving sum calculations to obtain moving sum averages of the filtered signal to create a high-to-low transition and a low-to-high transition in phase values. The high-to-low transition indicates the transition from a random phase value to a constant phase value. Similarly, the low-to-high transition indicates the transition from a constant phase value to a random phase value. Specifically for the Eureka 147 system signal, the high-to-low transition occurs at approximately ⅘ of the symbol period and the low-to-high transition occurs at the end of the symbol period or the beginning of the next symbol period.

The method for obtaining symbol timing synchronization may therefore be set forth. An input signal is first delayed with a predetermined amount of duration. The input signal is then multiplied with the complex conjugate of the delayed input signal to produce a product signal. This is followed by determining argument values of the product signal over at least one symbol duration, from which phase transitions may be identified because there will be a substantial decrease in phase values within the symbol duration. There will also be a substantial increase in phase values from one portion of the symbol to a contiguous symbol.

To facilitate the transition detection process, a differentiation step may be implemented to smooth sample to sample transitions. Following the smoothing of the signal is the determination of absolute phase values to produce a resultant signal to change the phase distribution. The resultant signal is filtered to remove interference. Moving sum calculations are performed on the filtered resultant signal to obtain moving sum averages to create a high-to-low transition and a low-to-high transition in phase values within the symbol duration. The high-to-low and low-to-high transitions are then detected for symbol timing synchronization.

Additionally, the present invention obtains symbol timing synchronization and fractional carrier frequency offset estimation with reference to the transition locations. From equation (1) above, a fractional carrier phase offset $\Delta f_R$, may be obtained by dividing the argument value of the signal z(t) with a product of two multiplied by II multiplied by $T_u$. Additionally, since the argument value of z(t) during the first ⅘ of the symbol period is a random value, the estimation of the fractional carrier frequency offset, $\Delta f_R$, is only conducted during the final ⅕ of the symbol period, $T_s$, in order to alleviate multipath fading. Thus, the estimation of the fractional frequency offset is triggered at a high-to-low transition, and the estimation is terminated at the following low-to-high transition.

Therefore, the present invention also provides a method for obtaining carrier frequency synchronization with diminishing impact due to multipath distortion. An input signal is first delayed with a predetermined amount of duration. The input signal is then multiplied with the complex conjugate of the delayed input signal to produce a product signal. This is followed by determining argument values of the product signal over at least one symbol duration, from which phase transitions may be identified because there will be a substantial decrease in phase values within the symbol duration. There will also be a substantial increase in phase values from one portion of the symbol to a contiguous symbol.

To facilitate the transition detection process, a differentiation step may be implemented to additionally reveal the transitions of phase distributions. Absolute phase values are then obtained to produce a resultant signal to change the phase distribution, and the resultant signal is filtered to remove interference. Moving sum calculations are performed on the filtered resultant signal to obtain moving sum averages to create a high-to-low transition and a low-to-high transition in phase values within the symbol duration. In order to minimize the effect of multipath distortion, fractional carrier frequency offset estimation begins at the first high-to-low transition within a symbol and the estimation is terminated at the following low-to-high transition.

Referring to FIG. 4, median filter and moving sum circuit 166 provides an input to transition detection circuit 168 to detect high-to-low and low-to-high phase value transitions. Transition detection circuit 168 then provides an output, which is the output of detection circuit 16 in FIG. 3, to either trigger or terminate fractional carrier frequency offset estimation. Specifically, fractional carrier frequency offset estimation is triggered at the high-to-low transition and terminated at the low-to-high transition. Detection circuit 16 is coupled to position tracking circuit 18, which monitors the variation of the symbol timing, to compare the locations of the phase transitions with those of the previous symbol.

Referring again to FIG. 3, detection circuit 16 is also connected to arithmetic circuit 15. Arithmetic circuit 15, together with correlation circuit 10, arithmetic circuit 14, and average filter 17, constitute the circuit for estimation of fractional carrier frequency offset. Therefore, at the first high-to-low phase transition, detection circuit 16 triggers arithmetic circuit 15 to begin estimation of the fractional carrier frequency offset. At the following low-to-high phase transition, detection circuit 16 provides a signal to arithmetic circuit 15 to terminate fractional carrier frequency offset estimation. By limiting the estimation of the fractional carrier frequency offset only to the portion of a symbol where the phase value is a constant, the impact of multipath fading or distortion is diminished.

After having been triggered by detection circuit 16, arithmetic circuit 15, coupled to arithmetic circuit 14 and detection circuit 16, divides the argument value provided by arithmetic circuit 14 by a product of two multiplied by II multiplied by the predetermined delay interval, $T_u$. The result is then provided to average filter circuit 17 to determine the estimated fractional frequency offset, $\Delta f_R$, of the input signal in accordance with equation (1). The estimated fractional frequency offset is then subjected to digital-to-analog conversion by a digital-to-analog converter ("DAC") 30 and compensated by an AFC circuit (not shown). Fractional frequency offset is estimated. This estimation is also applicable to any OFDM symbol, including the PR and those in the fast information and main service channels of the Eureka 147 signals. Therefore, fractional frequency of the present invention may be estimated in many places in a DAB frame as the need arises.

The present invention also provides a system and method for obtaining frame synchronization. Therefore, since the signal level of the Eureka 147 system during the null symbol is below that of noise, the null symbol may be detected by a power estimator. However, when the signal level of an OFDM signal is very low, the phase output of correlation detection circuit 10 is highly distorted due to the presence of noise. Therefore, when a signal level is less than a predetermined threshold, the phase output of arithmetic circuit 14 is set equal to the previous output. This decision is made by a power estimator 12, which receives an input signal from detection circuit 10 to detect for the first symbol of the OFDM input signal, the null symbol. Power estimator circuit 12 may be implemented with an envelope detector to provide an input to arithmetic circuit 14.

Because an ordinary envelope detector may not provide accurate detection of the null symbol, considering the random fluctuations between samples, a threshold value may be taken between signal and noise levels to indicate null to PR transition at the beginning of data frames. The signal value, in a digital audio broadcasting system, varies with distance and fading environment. However, the noise level is relatively constant, e.g., thermal noise of approximately −112 dBm. Therefore, the threshold value may be set based on the noise level. After the threshold value has been set, the OFDM symbols in the input signal are compared to the threshold value, and the numbers of samples larger and smaller than the threshold value are separately recorded. The null to PR transition is located when the number of samples having values greater than the threshold value is larger than the number of samples having values smaller than the threshold value. Once the null and PR symbols are detected, frame synchronization is achieved.

Additionally, the null to PR transition also generates a low rate frame clock used to trigger a sampling clock for fast Fourier transform ("FFT") processing of the symbols for synchronization and DPQSK demodulation. A frame clock generator 40 is triggered by power estimator circuit 12.

Clock generator 40 provides a frame clock to a timer 42, which may be manually selected by a user. Timer 42 then provides the sampling clock signal to a fast Fourier transform circuit 20. Position tracking circuit 18 provides an input to an average filter 50 and other components that constitute a path for adjusting the sampling clock rate of timer 42, if necessary. The sampling clock adjustment loop includes average filter 50, a DAC circuit 48, a VCXO oscillator circuit 46, a clock divider 44, and timer 42. Together with tracking circuit 18 and frame clock generator 40, the sampling clock adjustment loop comprises a path for adjusting the sampling clock phase to compensate for frame, or symbol, timing offset.

After having estimated the fractional frequency offset of the carrier phase, the integral frequency offset may be obtained through matched filtering against PR symbols of residual integral frequency offsets, since the possible residual integral frequency offsets to be matched are limited. However, as calculations in the time domain are complex, an FFT operation is applied to the input signal. An output of the FFT operation is multiplied with a frequency shifted PR symbol and then subject to an inverse FFT operation. The peak of the inversely fast Fourier transformed signal is then detected. More particularly, with reference to FIG. 3, an FFT circuit 20 transforms the input signal. An output of FFT circuit 20 is provided to a multiplying circuit 25, which is respectively connected to circuit 20 and a frequency shifted phase reference circuit 28 to multiply the respective outputs of circuit 20 and frequency shifted phase reference circuit 28. Circuit 28 receives a phase reference in the frequency domain from synchronization circuit 26, which determines whether synchronization has been lost. The phase reference is shifted by an integer offset determined by circuit 26. The product of multiplying circuit 25 is applied to an inverse FFT circuit 22. A peak detection circuit 24 coupled to the output of inverse FFT circuit 22 detects occurrence of a peak to indicate the carrier frequency offset.

As described, the carrier frequency offset is determined through matched filtering by using the PR symbol as a reference. During the matched filtering process, one PR symbol will match most closely with the received input signal and will have a peak output, while the other PR symbols will generate noise-like outputs after inverse FFT. This result may be obtained through iteration. Because a practical oscillator has frequency stability on the order of several p.p.m., only a few frequency offsetted phase reference symbols are required for the matched filtering process. The iterative matched filtering process may also be performed in parallel.

In a preferred embodiment, synchronization tracking circuit 26 compares and ascertains whether previously established synchronization has been lost due to an interruption in signal reception. Instead of initiating a synchronization process whenever signal reception is interrupted or lost as in conventional systems and methods, the system and method of the present invention determine that if synchronization has not been lost after signal reception has been re-established, no synchronization process will be initiated. Thus, the synchronization system and method of the present invention is able to establish synchronization in a relatively expedited manner in situations where there is an interruption in signal reception. The tracking circuit may be designed such that it not only tracks synchronization of carrier frequency offset as a whole, but also fractional and integral frequency offsets individually.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for determining symbol timing information from an input signal having a symbol duration and including at least one OFDM symbol having at least one guard interval, comprising:

correlation means for providing a product of the input signal with a complex conjugate of a delayed input signal;

means for calculating argument values of said product for providing a conditioned signal having a transition in phase values by rendering phase values of a portion of the symbol duration substantially less than phase values of the remaining portion of the symbol duration; and detection means, coupled to receive the conditioned signal from said means for calculating argument values, for detecting said transition in phase values as symbol timing information.

2. The apparatus as recited in claim 1 further comprising arithmetic means, coupled between said means for calculating argument values and said detection means, for obtaining absolute values of the conditioned signal.

3. The apparatus as recited in claim 1 further comprising arithmetic means, coupled between said means for calculating argument values and said detection means, for performing moving sum calculations on the conditioned signal thereby providing an indication in phase values transition at a same location as said transition in phase values.

4. The apparatus as recited in claim 1 further comprising differentiator means, coupled between said means for calculating argument values and said detection means, for revealing more clearly said transition in phase values.

5. The apparatus as recited in claim 1 wherein said correlation means comprises:

delay means for providing a predetermined delay to the input signal;

arithmetic means, coupled to received the delayed input signal of said delay means, for providing a complex conjugate of the delayed input signal; and multiplication means, coupled to receive the input signal and an output of said arithmetic means, for multiplying the input signal with the output of said arithmetic means.

6. The apparatus as recited in claim 2 wherein said arithmetic means is a full wave rectifier.

7. A synchronization system for an input signal having at least one OFDM symbol including at least one guard interval, comprising:

correlation means for providing a product of the input signal with a complex conjugate of a delayed input signal;

arithmetic means, coupled to receive an output of said correlation means, for obtaining argument values of said product; and detection means, coupled to said arithmetic means, for detecting a transition in phase values of an output of said arithmetic means, said transition occurring when a phase value in one portion of the symbol duration is substantially smaller than a phase value of the remaining portion of the symbol duration.

8. The system as recited in claim 7 further comprising power estimation means, coupled between said correlation means and said arithmetic means, for detecting an OFDM symbol frame of the input signal with reference to a predetermined threshold value.

9. The system as recited in claim 7 further comprising means for estimating fractional carrier frequency offset, coupled to said arithmetic circuit and said detection means.

10. The system as recited in claim 7 wherein said detection means comprises differentiator means for revealing more clearly said transition in phase values.

11. The system as recited in claim 10 further comprising means, coupled to said differentiator means, for performing moving sum calculations on an output of said differentiator means thereby providing an indication of the transition in phase values at the same location as the transition in phase values.

12. The system as recited in claim 9 wherein said detection means triggers said means for estimating fractional carrier frequency offset at the transition in phase values.

13. The system as recited in claim 9 further comprising tracking means coupled to said means for obtaining fractional frequency offset for determining whether synchronization has been lost.

14. A method for estimating fractional carrier frequency offset of an input signal having a plurality of OFDM symbols, each symbol including of at least one guard interval, comprising the steps of:

delaying the input signal by a predetermined duration;

multiplying the input signal with a complex conjugate of the delayed input signal;

determining argument values of the multiplied signal to produce an output signal having at least one high-to-low transition such that phase values of a first portion of the symbol decrease substantially comparing to a second portion of the symbol and at least one low-to-high transition such that phase values of a third portion of the symbol increase substantially comparing to a fourth portion of the symbol;

identifying said high-to-low phase transition in one of the plurality of OFDM symbols; and commencing estimation of the fractional carrier frequency offset at said high-to-low phase transition.

15. The method as recited in claim 14 further comprising the steps of:

identifying said low-to-high phase transition in one of the plurality of OFDM symbols contiguous to the OFDM symbol from which said high-to-low phase transition is identified; and terminating said estimation of the fractional carrier frequency offset at said low-to-high phase transition.

16. The method as recited in claim 14 further comprising the step of applying moving sum calculations after argument values have been determined.

17. A method for obtaining symbol timing synchronization of an input signal having a plurality of OFDM symbols, each symbol having at least one guard interval, comprising the steps of:

delaying the input signal by a predetermined amount of duration;

multiplying the input signal with a complex conjugate of the delayed input signal;

determining argument values of the multiplied signal to produce an output signal having at least one high-to-low transition such that phase values of a first portion of the symbol decrease substantially comparing to a second portion of the symbol and at least one low-to-high transition such that phase values of a third portion of the symbol increase substantially comparing to a fourth portion of the symbol;

identifying said high-to-low phase transition in one of the plurality of OFDM symbols; and identifying said low-to-high phase transition in one of the plurality of OFDM symbols contiguous to the OFDM symbol from which said high-to-low phase transition is identified.

18. The method as recited in claim 17 further comprising the step of applying moving sum calculations after argument values have been determined.

* * * * *